Figure 1:
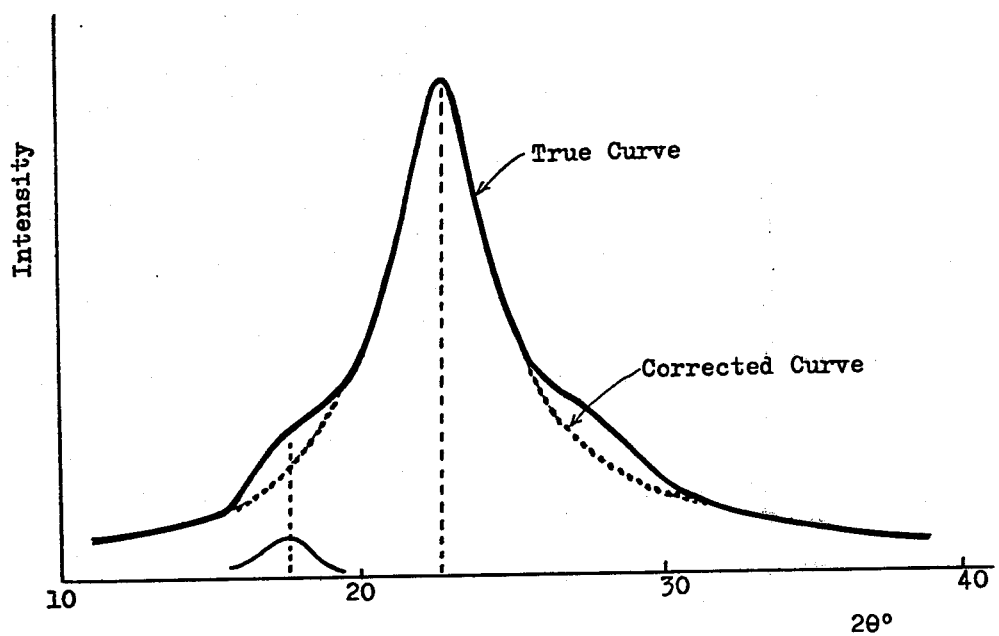

United States Patent

Konomi et al.

[11] 4,072,664
[45] Feb. 7, 1978

[54] AROMATIC POLYAMIDES FROM N,N'-BIS(P-AMINOBENZOYL)ETHYLENE DIAMINE

[75] Inventors: Tuyoshi Konomi; Seiji Endo; Masayasu Yamaguchi; Kenichi Katsuo, all of Ootsu, Japan

[73] Assignee: Toyobo Co., Ltd., Osaka, Japan

[21] Appl. No.: 550,112

[22] Filed: Feb. 14, 1975

[30] Foreign Application Priority Data

Feb. 15, 1974 Japan .................................. 49-18736

[51] Int. Cl.$^2$ .............................................. C08G 69/32
[52] U.S. Cl. .............................. 260/78 R; 57/140 R; 260/30.2; 260/30.8 R; 260/30.6 R; 260/32.6 NA; 260/78 A; 260/78 S; 260/558 A; 264/176 F
[58] Field of Search ........................... 260/78 R, 78 A

[56] References Cited
PUBLICATIONS

Chemical Abstracts, vol. 83, 1975, 80259t.

*Primary Examiner*—Harold D. Anderson
*Attorney, Agent, or Firm*—Birch, Stewart, Kolasch and Birch

[57] ABSTRACT

An aromatic polyamide comprising (1) a unit of the formula:

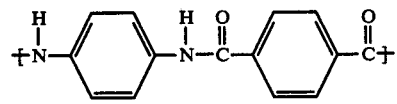

and (2) a unit of the formula:

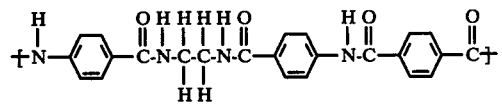

and being excellent in strength, rigidity and heat resistance and improved in light resistance, flexibility and wear resistance, which can be produced by polycondensation of a diamine component comprising N,N'-bis(p-aminobenzoyl)-ethylenediamine and p-phenylenediamine, the content of the N,N'-bis (p-aminobenzoyl)ethylenediamine being from about 0.6 to 50 mol %, with a dicarboxylic acid component comprising terephthalic acid or its reactive derivative in a substantially equimolar amount to the diamine component in an amide polar solvent.

17 Claims, 2 Drawing Figures

AROMATIC POLYAMIDES FROM N,N'-BIS(P-AMINOBENZOYL)ETHYLENE DIAMINE

The present invention relates to novel aromatic polyamides and their production. More particularly, it relates to novel aromatic polyamides excellent in strength, rigidity and heat resistance and improved in light resistance, flexibility and wear resistance, and their production.

For imparting high strength and excellent rigidity to shaped products such as fibers and films, the chemical structure of a polymer of which the shaped products are made must be generally so designed as having a regularity, a tenacity and a symmetry and satisfying various factors concerning crystallinity, intermolecular force and the like. In this sense, polyamides consisting of phenylenediamine units and phthalic acid units (hereinafter referred to as "all-aromatic polyamides"), especially the ones in which the main chain of the polymer is formed by linkage at the para-position of the aromatic ring, are representative compounds having a chemical structure which meets the said requirements. Thus, all-aromatic polyamides of said type are excellent in strength and rigidity. However, their flexibilities and wear resistance are more or less insufficient so that, when they are used as materials for tire cords, problems in impact strength and wear resistance on running and adhesion with rubbers are caused. Further, they usually show a poor light resistance, which makes the strength lower which causes various disadvantages in post-treatment operations and uses.

As an result of the extensive study for obtaining novel aromatic polyamides which are improved in light resistance, flexibility and wear resistance while retaining excellent strength, rigidity and heat resistance inherent to conventional all-aromatic polyamides, it has now been found that an aromatic polyamide wherein the N,N'-bis(p-aminobenzoyl)ethylenediamine unit is introduced in a polyamide chain mainly consisting of the unit derived from terephthalic acid and the unit derived from p-phenylenediamine, has the desired properties. This is entirely of an unexpected nature, because an excellent rigidity inherent to all-aromatic polyamides has been understood to be much reduced by the introduction of a long chained methylene unit into them.

According to the present invention, there is provided an aromatic polyamide which comprises (1) a unit of the formula:

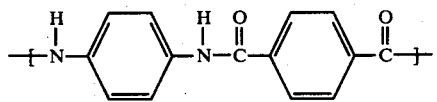  (I)

and (2) a unit of the formula:

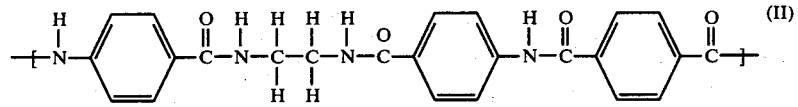  (II)

, the amount of the unit (2) being about 0.6 to 50 mol %, preferably about 10 to 50 mol %, on the basis of the total amount of the units (1) and (2).

The aromatic polyamide of the invention can be produced by polycondensation of a diamine component comprising N,N'-bis(p-aminobenzoyl)ethylenediamine and p-phenylenediamine, the amount of N,N'-bis(p-aminobenzoyl)ethylenediamine being from about 0.6 to 50 mol % based on the combined amount of the diamine component, with a dicarboxylic acid component comprising terephthalic acid or its reactive derivative in a substantially equimolar amount to the diamine component in at least one amide polar solvent.

The amount of N,N'-bis(p-aminobenzoyl)ethylenediamine in the diamine component is required to be from about 0.6 to 50 mol %, more preferably from about 10 to 50 mol %, much more preferably from about 12.5 to 30 mol %. When the amount is larger than the said upper limit, rigidity, heat resistance and chemical resistance are reduced, though the plasticity is increased. When smaller than the said lower limit, light resistance, flexibility and wear resistance are not improved.

The N,N'-bis(p-aminobenzoyl)ethylenediamine to be used in the invention may be readily prepared in a high yield by hydrogenation of N,N'-bis(p-nitrobenzoyl)ethylenediamine, which is obtained by the reaction ethylenediamine with p-nitrobenzoyl halide or alkyl or aryl p-nitrobenzoate. Since the reactivity of N,N'-bis(p-aminobenzoyl)ethylenediamine is similar to that of p-phenylenediamine, any difficult problem does not arise from its use on the polycondensation. By the use of the diamine component in mixture, the immediate solidification as seen on the polycondensation for production of all-aromatic polyamides is rather prevented so that the reaction operation is facilitated and the product of a high polymerization degree is obtained.

As the reactive derivative of terephthalic acid, there may be used, for instance, terephthalyl dihalide such as terephthalyl dichloride or terephthalyl dibromide.

In preparation of the aromatic polyamide of the invention, any suitable aromatic diamine and/or dicarboxylic acid monomer other than the said essential components, i,e. N,N'-bis(p-aminobenzoyl)ethylenediamine, p-phenylenediamine and terephthalic acid or its reaction derivative, may be optionally employed insofar as the physical properties of the resultant product are not deteriorated. Examples of such monomers are m-phenylenediamine, isophthalyl dihalides. 4,4'-diaminodiphenylmethane, 4,4'-diaminodiphenyl ether, 4,4'-diaminodiphenyl sulfone, 3,3'-diaminodiphenyl sulfone, etc. Their lower alkylsubstituted derivatives, lower alkoxy-substituted derivatives and halogen-substituted derivatives are also utilizable.

As the amide polar solvent, there may be exemplified hexamethylphosphoramide, N-methylpyrrolidone, tetramethylurea, N,N-dimethylacetamide, etc. Among them, the most preferred is a mixture of hexamethylphosphoramide and N-methylpyrrolidone, usually in a volume ratio of from about 3 : 1 to 1 : 4, preferably from about 2 : 1 to 1 : 3.

The polycondensation of the invention may be effected, for instance, by the interfacial polymerization method (cf. Japanese Patent Publication No. 13247/1960) or the solution polymerization method (cf. Japanese Patent Publication No. 14399/1960). For obtaining the product having a high degree of polymerization, the solution polymerization method is the most preferable.

In the solution polymerization, the diamine component is usually first dissolved in an amide polar solvent substantially free from water and, if necessary, suitable additives such as an acid-acceptor are added thereto. As the acid-acceptor, there is ordinarily used a tertiary diamine, of which specific examples are triethylamine, pyridine, N-ethylmorpholine, N-ethylpiperidine, and N-methyipyrrolidine, etc. The amount of the acid-acceptor may be about 10% by volume or less, preferably about 7% by volume or less, to the amide polar solvent. In the amide polar solvent, there may be incorporated a small amount of a salt such as an alkali metal or alkaline earth metal salt (e.g. lithium chloride, lithium bromide, calcium chloride) so as to enhance the dissolving ability.

The thus prepared solution is then cooled to a temperature of from about $-30°$ to $10°$ L C, preferably from about $-20°$ to $5°$ C, and the dicarboxylic acid component (preferably terephthalyl dihalide) is, as such or dissolved in a suitable inert solvent, added thereto all at once under stirring. The reaction takes place immediately after the addition, and the temperature of the reaction system is elevated due to the generation of heat. The reaction is completed normally in about 0.05 to 8 hours.

The produced aromatic polyamide may be separated by pouring the reaction mixture into a liquid medium which can hardly dissolve the product such as water. If necessary, the aromatic polyamide may be crushed into powders by a high speed blender and washed with a liquid material which can hardly dissolve the product such as water or methanol, followed by drying.

The control of the polymerization degree of the aromatic polyamide may be effected by any optional procedure, for instance, by changing the molar ratio of the diamine component and the dicarboxylic acid component, by adding to the reaction system a designed amount of a suitable substance such as monofunctional amines, acid halides or water or by regulating the concentration of the monomer components.

The aromatic polyamide thus produced shows sufficient solubilities not only to specific solvents such as sulfuric acid but also to polar solvents of amides such as hexamethylphosphoramide, N-methyl-2-pyrrolidone, tetramethylurea and N,N'-dimethylacetamide. In case of using a polar solvent of amides for preparation of a dope, an alkali metal or alkaline earth metal salt such as lithium chloride, lithium bromide or calcium chloride may be used together with the solvent so as to increase the stability of the dope. In case of using sulfuric acid for preparation of the dope, conc. sulfuric acid (e.g. 95% by weight or higher) or fuming sulfuric acid is desirable for obtaining a stable solution without gelation.

The spinning is usually carried out under the following conditions: concentration of polymer in dope, 5 − 30% by weight (perferably 7 − 23% by weight), temperature of dope to be extruded, 20°− 100° C; temperature of coagulating bath, 0°− 100° C (preferably 1°− 20° C). For spinning, there may be adopted a conventional dry or wet method. There may be also adopted the air gap method, for instance, as described in Japanese Patent No. 160,942 or Japanese Patent Publication No. 815/1967.

The aromatic polyamides of the invention possess various advantageous properties. For instance, the knot strength of the filament made of conventional poly(p-phenyleneterephthalamide) may be about 6.5 g/d at the best, while that of the filament made of the aromatic polyamide of the invention can reach to about 9 g/d. This is quite meritorious as the material for tire cords, because a higher knot strength shows a higher wear resistance.

Further, for instance, the aromatic polyamides of the invention are imparted excellent flexibility and chemical resistance while maintaining a high crystalline modulus of elasticity. It is particularly notable that their resistance to sulfuric acid is much higher than that of polyamides modified by the introduction of various functional groups such as esters, imides and amides into their chain. It is also notable that their sulfuric acid dope shows a much lower viscosity than the dope of the said modified polyamides. For instance, the aromatic polyamide of the invention shows a minimum viscosity at a concentration of not less than about 21% by weight when dissolved in sulfuric acid having a purity of not lower than about 95% by weight. In addition, they can afford an optimum sulfuric acid dope for production of a filament having favorable physical properties with a higher concentration. Thus, the sulfuric acid dope of the aromatic polyamide of the invention is of higher safety, better spinnability and more efficient productivity.

Moreover, for realizing a tensile strength for about 18 to 20 g/d or more, conventional all-aromatic polyamides need a logarithmic viscosity $[\eta_{inh}]$ of not less than about 3.5. The aromatic polyamides of this invention can realize such tensile strength when their logarithmic viscosity is from about 2.2 to 3.5.

The characteristic properties of the filament made of the aromatic polyamide of the invention can be well explained by the use of the I.D. value (Degree of Imperfection) value which represents the degree of the disorders in the polymeric crystalline parts of the filement and is determined by utilization of X ray diffractometry according to the procedure as hereinafter described.

The filament is placed vertically to an X ray beam, and the equatorial scattering profil is drawn taking the fiber axis as the meridian to give a curve as shown in FIG. 1 of the accompanying drawings. The peaks of the curve at the lower angle side are obscure in the Figure but are revealed by applying thereto the background, the correction for polarization and the incoherent scattering (cf. L. E. Alexander: X ray Diffraction Methods in Polymer Science, Wiley Interscience, 1969) and dissolving it into two Gaussian curve (cf. Masao Kakudo et al.: X ray Diffractometry of High Molecules, Maruzen, 1968). Usually, these two curves are located at 3.70 − 4.30 A and 4.33 − 5.20 A in interplaner spacing, respectively. The former and the latter are respectively called as (200) reflection and $$\binom{010}{210}$$

and the I.D. value is represented by the following equation:

$$\text{I.D. value} = \frac{d\binom{010}{210}}{4.33}$$

Figure 2:
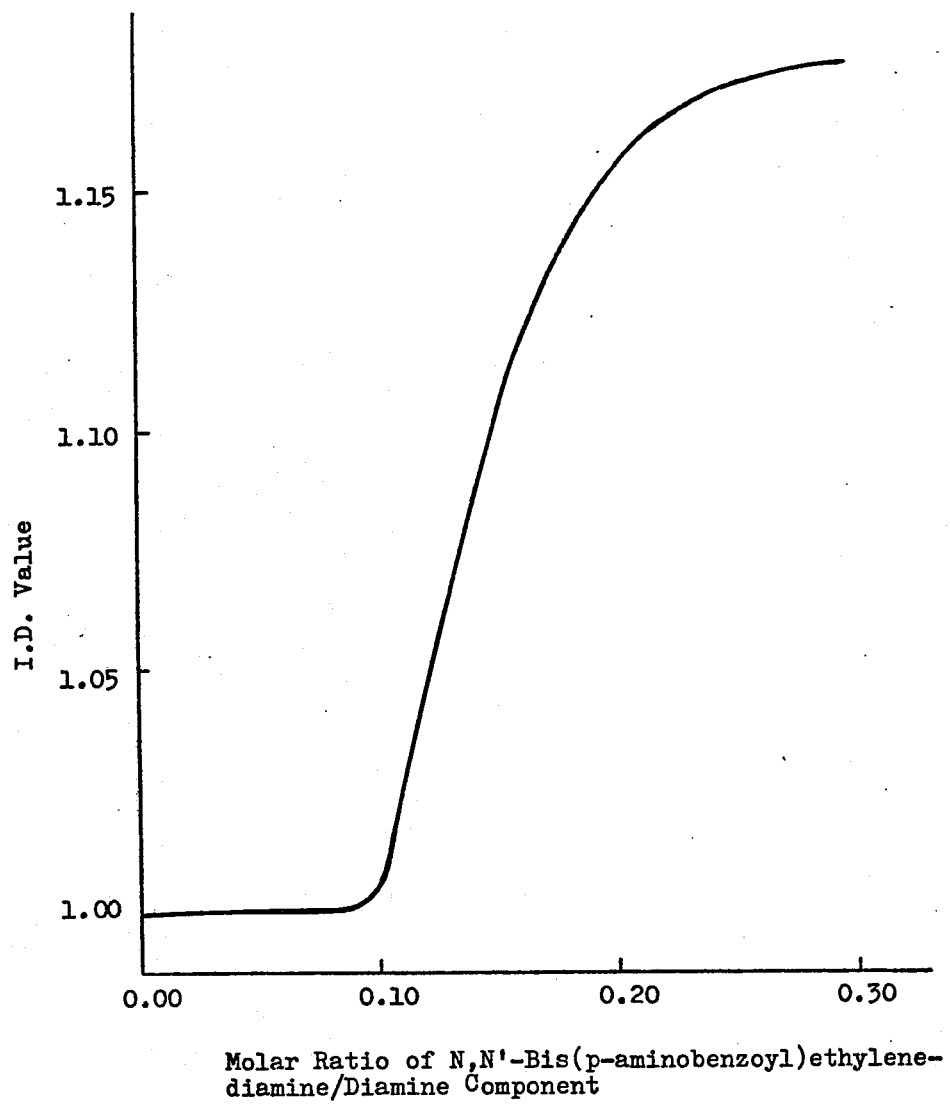

When the X ray diffractometry is applied to the filament made of the aromatic polyamide of the invention, the relationship between the I.D. value and the molar ratio of N,N'-bis(p-aminobenzoyl)ethylenediamine to the diamine component is as shown in FIG. 2, from which it is understood that, when the aromatic polyamide of the invention is spun under an approriate condition to make a filament, N,N'-bis(p-aminobenzoyl)ethylenediamine is taken into crystals of poly(p-phenyleneterephthalamide) and the interplander spacing is increased with a higher molar ratio of N,N'-bis(p-aminobenzoyl)ethylenediamine to the diamine component. Thus, it is recognized that the introduction of the disorders into the polymeric crystalline parts by the use of N,N'-bis(p-aminobenzoyl)ethylenediamine as a monomeric component results in the increase of elongation and knot strength. The I.D. value of the filament made of the aromatic polyamide of the invention is preferred to be not less than about 1.04.

Further, the filament made of the aromatic polyamide of the invention is preferred to show a birefringence ($\Delta n$) of not less than about $370 \times 10^{-3}$, particularly of from about $390 \times 10^{-3}$ to $450 \times 10^{-3}$, when determined according to the conventional standard method (cf. J. F. Rund et al.: Journal of Applied Physics, 27, 976 (1956)).

The aromatic polyamides of the invention are utilizable as materials for production of fibers and films. They are particularly useful as materials for production of tire cords and plastic reinforcing agents.

Practical and presently preferred embodiments of the invention are illustratively shown in the following Examples. In these Examples, the logarithmic viscosity $[\eta_{inh}]$ of the polymer indicates a value obtained from a relative viscosity $[\eta_{rel}]$, which is determined at 30° C on a solution of the polymer (0.5 g) in 96% sulfuric acid (100 ml), by calculation according to the following equation:

$$[\eta_{inh}] = \frac{\ln [\eta_{rel}]}{C}$$

wherein C is the concentration of the polymer (g/100 ml).

The wear resistance of yarn is determined by the test for friction-cohesion of yarn in which the friction between yarns is carried out by the use of a tester for friction-cohesion of yarn (manufactured by Toyo Seiki K.K.) so as to examine the cohesiveness of yarns and the state of wear. This tester comprises a sliding wheel and a fixable wheel on a rail and the diameter of the wheels and the distance between the centers of the wheels being 15 mm and about 60 mm, respectively. The sliding wheel is pulled by a cart to give a tension to the yarn tested which goes around the sliding wheel, crosses between the two wheels to obtain an appropriate degree of twist, goes around the fixable wheel and comes to a driving means. The driving means makes a reciprocating motion at a rate of 100/min. in a distance of 30 mm. The angle of cross of the yarn between the wheels can be regulated by swinging the sliding wheel on both sides. The distance between the wheels and therefore the angle of the cross of the yarn can be maintained unchanged by moving the fixable wheel on operation. When the yarn snaps, the switch is cut off, and the number of times until the snapping is taken as the index for the wear resistance.

The flexibility is determined by taking account of the knot strength, the wear resistance, the twist resistance and other properties all together.

EXAMPLE 1

Preparation of N,N'-bis(p-nitrobenzoyl)ethylenediamine

In a 2 litre volume flask equipped with a reflux condenser, a thermometer, a stirrer and an inlet for reagents, the atmosphere in the flask being replaced by dry nitrogen to obtain an anhydrous state, dried benzene (1000 ml), ethylenediamine (30 g; 0.5 mol) and triethylamine (111 g; 1.1 mol) are charged, and the resultant uniform solution is cooled at 5° to 10° C. A solution of p-nitrobenzoyl chloride (185 g; 1.0 mol) in benzene (500 ml) is added thereto in 60 minutes while vigorous stirring. After stirring is continued for further 2 hours, the reaction mixture is filtered, and the collected precipitate is washed with methanol, water and methanol in order in a mixer and then dried. Recrystallization from dimethylacetamide (1.5 litres) affords white needles (143 g) melting at 269° to 271° C. Yield, 80%.

This substance is identified to be N,N'-bis(p-nitrobenzoyl)ethylenediamine by the IR absorption spectrum and the elementary analysis (N: found, 15.68; calcd., 15.64).

EXAMPLE 2

Preparation of N,N'-bis(p-nitrobenzoyl)ethylenediamine

The same procedure as in Example 1 is repeated but using ethylenediamine (60 g; 1.0 mol), p-nitrobenzoyl chloride (370 g; 2.0 mol), triethylamine (222 g; 2.0 mol) and benzene (2500 ml) whereby N,N'-bis(p-nitrobenzoyl)ethylenediamine (241 g) is obtained. Yield, 81.3%. Elementary analysis (found): N, 15.67.

EXAMPLE 3

Preparation of N,N'-bis(p-aminobenzoyl)ethylenediamine

In a 2 litre volume autoclave for high pressure, N,N'-bis(p-nitrobenzoyl)ethylenediamine (140 g; 0.39 mol), Raney nickel (5 g) and dimethylacetamide (700 ml) are charged, and the atmosphere in the reaction vessel is well replaced by hydrogen. Then, the contents are stirred at 70 to 100° C for about 3 hours while introducing hydrogen (90 kg/cm$^2$) to effect hydrogenation of the nitro group. The reaction mixture is heated to dissolve the produced diamine, Raney nickel is removed off by filtration, and the filtrate is poured into water (5 liters). The resultant precipitate of the diamine is separated and dried to obtain crude crystals (108 g; yield, 93%). Recrystallization from dimethylacetamide (1.5 liters) affords white crystals melting at 293.5° to 295° C.

EXAMPLE 4

Preparation of N,N'-bis(p-aminobenzoyl)ethylenediamine

The same procedure as in Example 3 is repeated but using N,N'-bis(p-nitrobenzoyl)ethylenediamine (140 g; 0.39 mol), Raney nickel (5 g) and dimethylacetamide (800 ml) and adopting an initial pressure of 100 kg/cm$^2$ whereby N,N'-bis(p-aminobenzoyl)ethylenediamine is obtained. Yield, 94.8% (after recrystallization).

EXAMPLE 5

In a 300 ml volume flask equipped with a stirrer, a thermometer, an inlet for reagents and an inlet for dry nitrogen, the atmosphere in the flask being replaced by dry nitrogen to obtain anhydrous state, hexamethylphosphoramide (23 ml) and N-methyl-2-pyrrolidone (46 ml) are charged, and N,N'-bis(p-aminobenzoyl)ethylenediamine (2.983 g; 0.01 mol) and p-phenylenediamine (1.081 g; 0.01 mol) are portionwise added thereto under heating. The resultant uniform solution is cooled to 2° C, and fine powders of terephthalyl dichloride (4.060 g; 0.02 mol) are added thereto all at once while stirring whereby the polymerization reaction takes place immediately. Stirring is continued for about 10 minutes, and the reaction mixture is allowed to stand overnight. The product is washed with water and crushed into powders to obtain a polyamide quatitatively. The logarithmic viscosity of the thus obtained polyamide is 2.903.

EXAMPLE 6

In a 3 litre volume autoclave equipped with a stirrig apparatus of rotation-revolution type, the inside of the autoclave being well dried, hexamethylphosphoramide (683 g), N-methyl-2-pyrrolidone (1300 g), N,N'-bis(p-aminobenzoyl)ethylenediamine (26 g; 0.087 mol) and p-phenylenediamine (66 g; 0.61 mol) are charged under nitrogen stream, and the contents are stirred at room temperature. The resultant uniform solution is cooled to −3° C, and powdery terephthalyl dichloride (141.5 g; 0.697 mol) is added thereto, the powders of terephthalyl dichloride adhering to the wall of the reaction vessel being washed down by N-methyl-2-pyrrolidone (66 g). The polymerization reaction is effected for 90 minutes, and the reaction mixture is treated as in the preceding Example to obtain a polyamide showing a logarithmic viscosity of 4.250.

EXAMPLE 7

The same procedure as in Example 5 is repeated but using N,N'-bis(p-aminobenzoyl)ethylenediamine (0.895 g; 0.003 mol), p-phenylenediamine (1.838 g; 0.017 mol), terephthalyl dichloride (4.060 g; 0.02 mol), hexamethylphosphoramide (19 ml) and N-methyl-2-pyrrolidone (38 ml) to obtain a polyamide showing a logarithmic viscosity of 3.756.

EXAMPLE 8

The same procedure as in Example 5 is repeated but using N,N'-bis(p-aminobenzoyl)ethylenediamine (1.492 g; 0.005 mol), p-phenylenediamine (1.6221 g; 0.015 mol), terephthalyl dichloride (4.060 g; 0.02 mol), hexamethylphosphoramide (20 ml) and N-methyl-2-pyrrolidone (40 ml) to obtain a polyamide showing a logarithmic viscosity of 3.352.

EXAMPLE 9

A polyamide obtained as in Example 7 (logarithmic viscosity, 3.98) is dissolved in 98% sulfuric acid under stirring at room temperature in 3 hours to obtain a uniform dope (concentration of polyamide, 11.2% by weight; dope viscosity, about 1900 poise), which is, after defoaming under a reduced pressure of 20 to 25 mmHg, extruded through a spinneret (number of holes, 50) into a coagulating bath of water of 18° C under a pressure of nitrogen gas of 4 kg/cm², washed with water in a second bath and taken up on a bobbin. The fiber on the bobbin is immersed in water overnight and then dried at 80° C in a hot air drier. The yarn quality of the fiber is shown in Table 1.

Table 1

| | | |
|---|---|---|
| Spinning condition | Diameter of hole of spinneret (mm φ) | 0.06 |
| | Extrusion rate (g/min.) | 2.15 |
| | Length of coagulating bath (cm) | 40 |
| | Taking-up rate (m/min.) | 10 |
| Yarn quality | Single yarn denier (d) | 4.38 |
| | Dry strength (g/d) | 3.79 |
| | Elongation (%) | 12.91 |
| | Initial modulus (g/d) | 120.5 |
| | Knot strength (g/d) | 1.43 |

The above obtained unstreched fiber is heated at 500° C under a tension of 3% to give a fiber showing a dry strength of 8.41 g/d, an elongation of 3.76% and an initial modulus of 412.6 g/d.

EXAMPLE 10

A polyamide obtained as in Example 8 (logarithmic viscosity, 3.42) is dissolved in 98% sulfuric acid at room temperature while stirring to obtain a dope (concentration of polyamide, 12% by weight; viscosity of dope, about 2000 poise), which is, after defoaming as in Example 9 and filtration, extruded through a spinneret (number of holes, 50) into a coagulating bath of water of 20° C under a pressure of nitrogen of 4.1 kg/cm² by a gear pump, washed with water in a second bath and taken up on a bobbin. The fiber is immersed in water and then dried. The yarn quality of the thus obtained fiber is shown in Table 2.

Table 2

| | | |
|---|---|---|
| Spinning condition | Diameter of hole of spinneret (mm φ) | 0.06 |
| | Extrusion rate (g/min.) | 2.13 |
| | Length of coagulating bath (cm) | 40 |
| | Taking-up rate (m/min.) | 10 |
| Yarn quality | Single yarn denier (d) | 4.35 |
| | Dry strength (g/d) | 3.51 |
| | Elongation (%) | 15.3 |
| | Initial modulus (g/d) | 157.1 |

The above obtained unstretched fiber is heated at 480° C under a tension of 5% to give a fiber showing a dry strength of 7.48 g/d, an elongation of 5.1% and an initial modulus of 398 g/d.

EXAMPLE 11

A polyamide obtained as in Example 7 (logarithmic viscostiy, 3.82) is dissolved in 100% sulfuric acid under stirring at 85° C in 3 hours, and the resultant dope (concentration of polyamide, 20% by weight; dope viscosity, 1170 poise) is spun by a spinning machine in which the range from the spinning dope tank to the spinneret is kept at 75° to 85° C and the dope is, while kept at the same temperature, directly extruded through a nozzle into a coagulating bath of water of about 12° C. The spinning is effected by extruding the dope through a spinneret (number of holes, 10; hole diameter, 0.006 mm φ) by a gear pump under a pressure of nitrogen of about 4 kg/cm² and taking up the extruded product at a rate of 20 m/min. The taken-up product is, in a bobbin form, immersed in water for about 24 hours and dried at 80° C for 4 hours in a hot air drier to give a fiber showing a fineness of 5.34 d, a dry strength of 10.48 g/d, an elongation of 6.8%, an initial modulus of 219.1 g/d and a knot strength of 2.41 g/d.

When poly(p-phenyleneterephthalamide) (logarithmic viscosity, 5.01) is treated by the same procedure as above, there is obtained a fiber showing a fineness of 5.39 d, a dry strength of 12.75 g/d, an elongation of 4.7%, an initial modulus of 300.3 g/d and a knot strength of 1.29 g/d.

It is thus apparent that the fiber prepared from the polyamide of the invention is superior in knot strength and elongation.

EXAMPLE 12

A polyamide obtained as in Example 7 (logarithmic viscosity, 4.16) is dissolved in 100% sulfuric acid while stirring under nitrogen stream at 85° C in 5 hours, and the resultant dope (concentration of polyamide, 20% by weight; viscosity of dope, 1360 poise) is, after filtration and defoaming, extruded through a spinneret (hole diameter, 0.08 mm $\phi$; number of holes, 7) at a rate of 1.6 ml/min by a sending gear pump under a pressure of nitrogen of about 4 kg/cm² by way of a layer of air (thickness, about 7 mm) into a coagulating bath of water of 3° C and taken up at a designed rate as shown in Table 3. The spinnability on the spinning is extremely good. The taken-up product on a bobbin is immersed in water overnight and dried at 80° C for 4 hours in a hot air drier.

For comparison, a dope (concentration of polyamide, 20% by weight) prepared from poly(p-phenyleneterephthalamide) (logarithmic viscosity, 5.07) is extruded through a spinneret (hole diameter, 0.08 mm $\phi$; number of holes, 10) by way of a layer of air into a coagulating bath of water of 2° C and taken up at a rate of 200 m/min. to obtain a fiber.

As shown in Table 3, the fiber prepared from the polyamide of the invention possesses excellent physical properties and shows a high knot strength.

Table 3

| | Taking-up rate (m/min.) | Fineness (d) | Dry strength (g/d) | Elongation (%) | Initial modulus (g/d) | Knot strength (g/d) |
|---|---|---|---|---|---|---|
| Polyamide of invention | 120 | 6.60 | 20.70 | 5.3 | 417 | 6.87 |
| | 150 | 5.40 | 20.87 | 5.1 | 421 | 6.72 |
| | 200 | 4.02 | 20.26 | 4.8 | 453 | 6.54 |
| | 250 | 3.23 | 20.08 | 4.5 | 491 | 6.11 |
| Poly-(p-phenylene-terephthalamide) | 200 | 2.14 | 23.4 | 3.6 | 640 | 4.96 |

EXAMPLE 13

The same procedure as in Example 12 is repeated but adopting a taking-up rate of 180 m/min. to obtain a fiber showing a fineness of 6.01 d, a dry strength of 20.67 g/d, an elongation of 5.2%, an initial modulus of 420 g/d and a knot strength of 6.73 g/d. The fiber is subjected to a heat resistance test.

As shown in Table 4, the fiber prepared from the polyamide of the invention possesses a heat resistance almost equal to the fiber prepared from poly(p-phenyleneterephthalamide).

Table 4

| | Test conditions | Physical properties | Fiber prepared from polyamide of invention | Fiber prepared from poly (p-phenylene-terephthalamide) |
|---|---|---|---|---|
| Strength-maintaining degree | 200° C 100 hrs | Dry strength | 91.7 | 92.0 |
| | | Elongation | 84.3 | 86.5 |

Table 4-continued

| | Test conditions | Physical properties | Fiber prepared from polyamide of invention | Fiber prepared from poly (p-phenylene-terephthalamide) |
|---|---|---|---|---|
| after heat treatment (%) | 300° C 0.5 hr | Initial modulus | 104.7 | 107 |
| | | Dry strength | 84.9 | 85.3 |
| | | Elongation | 63.5 | 73.0 |
| | | Initial modulus | 111.8 | 137.0 |
| Physical property-maintaining degree on heating (%) | 150° C | Dry strength | 71.8 | 82.9 |
| | | Elongation | 90.9 | 127 |
| | | Knot strength | 76.1 | 61.2 |
| | | Initial modulus | 59.1 | 44.0 |
| | 200° C | Dry strength | 62.9 | 62.0 |
| | | Elongation | 87.5 | 124 |
| | | Knot strength | 57.4 | 57.5 |
| | | Initial modulus | 47.3 | 48.6 |

*) The numerals represent each a maintaining degree.

EXAMPLE 14

The fiber used in Example 13 is subjected to light resistance test. As shown in Table 5, the fiber prepared from the polyamide of the invention is superior to the fiber prepared from poly(p-phenyleneterephthalamide) in the strength maintaining degree after irradiation by a fade meter.

Table 5

| Time of irradiation by fade-o-meter | Physical properties | Polyamide of invention | Poly (p-phenylene-terephthalamide) |
|---|---|---|---|
| 40 hrs | Dry strength | 85.2 | 84.5 |
| | Elongation | 90.1 | 86.5 |
| | Initial modulus | 107 | 107 |
| 100 hrs | Dry strength | 69.1 | 50.1 |
| | Elongation | 70.2 | 54.3 |
| | Initial modulus | 93.2 | 91 |

*) The numerals represent each a maintaining degree.

EXAMPLE 15

A polyamide obtained as in Example 8 (logarithmic viscosity, 3.61) is dissolved in 100% sulfuric acid while stirring under nitrogen stream at 85° C in 3 hours to obtain a dope (concentration of polyamide, 20% by weight), which is extruded through a spinneret (hole diameter, 0.08 mm $\phi$; number of holes, 10) at a rate of 1.6 ml/min by way of a layer of air (thickness, about 7 mm) into a coagulating bath of water 4° C and taken-up on a bobbin at a rate of 120 m/min or 200 m/min. The taken-up product on a bobbin is immersed in water overnight and dried at 80° C for 4 hours in a hot air drier to give a fiber. The yarn quality of the fiber is shown in Table 6.

Table 6

| Taking-up rate (m/min.) | Fineness (d) | Dry strength (g/d) | Elongation (%) | Initial modulus (g/d) | Knot strength (g/d) |
|---|---|---|---|---|---|
| 120 | 3.86 | 16.31 | 5.6 | 385 | 6.52 |
| 200 | 2.48 | 17.25 | 5.3 | 405 | 6.91 |

EXAMPLE 16

The fiber obtained in Example 12 (under a taking-up rate of 200 m/min) is subjected to wear resistance test and twist resistance test. The results are shown in Table 7.

It is shown that the fiber prepared from the polyamide of the invention is superior to the fiber prepared from poly(p-phenyleneterephthalamide) in flexibility and twist resistance.

Table 7

| | Condition | | Fiber of invention | Fiber of poly (p-phenyleneterephthalamide) |
|---|---|---|---|---|
| Twist resistance | Strength-maintaining degree (%) | Number of twist (per 10 cm) | | |
| | | 0 × 0 | 100 | 100 |
| | | 30 × 30 | 106.1 | 94.6 |
| | | 40 × 40 | 120.3 | 101.5 |
| | | 60 × 60 | 129.0 | 105.6 |
| Wear resistance | Test for friction-conjugation of yarn (Number of times of operations until snapping) | | 93 | 60 |

EXAMPLE 17

A polyamide obtained as in Example 6 (N,N'-bis(p-aminobenzoyl)ethylenediamine content, 20 mol %; logarithmic viscosity, 3.42) is dissolved in 100% sulfuric acid under stirring at 85° C in nitrogen steam in 3 hours to give a uniform dope (concentration of polyamide, 22% by weight; dope viscosity, 2580 poise). Similarly, there is prepared a dope (concentration of polyamide, 20 % by weight; dope viscosity, 2350 or 1760 poise) by the use of a polyamide (N,N'-bis(p-aminobenzoyl)ethylenediamine content, 12.5 mol %; logarithmic viscosity, 3.49) or poly(p-phenyleneterephthalamide) (logarithmic viscosity, 5.42).

Each dope is, after filtration and defoamation, extruded through a spinneret (number of holes, 50; hole diameter, 0.06 mm $\phi$) at a rate of 7.58 to 8.33 g/min. (an injection rate at a nozzle, 31.5 to 34.7 m/min.) by a gear pump through a layer of air (thickness, about 10 mm) into a coagulating bath of about 2.5° C, passed through a recoagulating bath, washed with water, neutralized, oiled, dried at 120° C, and taken up on a bobbin at a rate of 150 m/min. The back pressure of nozzle is 70 kg/cm$^2$. The spinnability on the spinning is good.

The yarn quality, the greige cord construction, the dipped cord physical property and the wear resistance of the obtained filaments are as shown in Table 8, from which it is seen that the filament of the polyamide of the invention is excellent in flexing resistance, fibrillation resistance and fatigue resistance at the stage of unstretching and such excellent properties have correlations to the I.D. value determined by X ray diffractometry.

Table 8

| | | Fiber of polyamide of invention | | Poly (p-phenyleneterephthalamide) |
|---|---|---|---|---|
| | Properties | 12.5 mol % Comonomeric unit | 20 mol % Comonomeric unit | |
| Monofilament | Denier (d) | 2.11 | 1.97 | 2.05 |
| | Dry strength (g/d) | 22.9 | 23.7 | 23.8 |
| | Elongation (%) | 5.5 | 5.4 | 4.2 |
| | Initial modulus (g/d) | 526 | 580 | 598 |
| | Knot strength (g/d) | 5.4 | 6.5 | 4.6 |
| | Knot elongation (%) | 1.3 | 1.5 | 1.2 |
| Greige cord | Construction | 1400 d/2 | 1400 d/2 | 1400 d/2 |
| | Twist ply (T/in) | 10.8 | 10.8 | 10.8 |
| | Twist cable (T/in) | 10.8 | 10.8 | 10.7 |
| Dipped cord | Denier (d) | 3257 | 3209 | 3113 |
| | Strength (kg) | 57.1 | 53.8 | 50.3 |
| | Dry strength (g/d) | 12.1 | 16.8 | 16.2 |
| | Dry elongation (%) | 6.4 | 6.2 | 4.6 |
| | Dry heat shrinkage (%) | 0.35 | 0.35 | 0.40 |
| X-Ray difractometry | I.D. value | 1.055 | 1.156 | 1.000 |
| | $\Delta$ | $440 \times 10^{-3}$ | $425 \times 10^{-3}$ | $475 \times 10^{-3}$ |
| Wear resistance | Friction cohesion test (number of vibration until cutting) | 93 | 148 | 60 |
| | Mixing test | 28 | 23 | 45 |
| Fatigue resis- | Tube test (min) | 230 | 385 | 160 |

Table 8-continued

| | Fiber of polyamide of invention | | Poly (p-phenyl-leneterephthal-amide |
|---|---|---|---|
| Properties | 12.5 mol % Comonomeric unit | 20 mol % Comonomeric unit | |
| tance | | | |

Notes:
1) The tendency of fibrillation is estimated by the following mixing test: the water dispersed with fiber of 8 mm length (0.050 g/300 mol of water) is stirred with a mixer (1500 rpm) for 5 minutes. The fiber dried after treatment as above is observed through a microscope. The values indicated show the amount of hangneils generated on the both sides of fiber surface of 1.2 mm length.
2) The conditions for determination of thefatigue resistance by the tube test are according to the Japanese Industrial Standard (JIS) L 1017, 132 and 132-1.

What is claimed is:

1. A filament forming aromatic polyamide which consists essentially of (1) a unit of the formula:

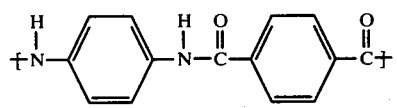

and (2) a unit of the formula:

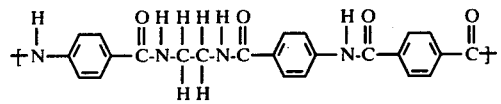

the amount of the unit (2) being from about 0.6 to 50 mol% on the basis of the combined amount of the units (1) and 2).

2. The aromatic polyamide according to claim 1, wherein the amount of the unit (2) is from about 10 to 50 mol % on the basis of the combined amount of the units (1) and (2).

3. The aromatic polyamide according to claim 1, which shows a minimum viscosity at a concentration of not less than about 21% by weight when dissolved in sulfuric acid having a purity of not lower than about 95% by weight.

4. The filament according to claim 1, which has a birefringence of from about $390 \times 10^{-3}$ to $450 \times 10^{-3}$.

5. A process for preparing a filament forming aromatic polyamide, which comprises polycondensing a diamine component comprising N,N'-bis (p-aminobenzoyl)ethylenediamine and p-phenyl-enediamine, the amount of N,N'-bis(p-aminobenzoyl)ethylenediamine being from about 0.6 to 50 mol % on the basis of the amount of diamine component, with a dicarboxylic acid component comprising terephthalic acid or its reactive derivative in a substantially equimolar ratio in at least one amide polar solvent.

6. The process according to claim 5, wherein the amount of N,N'-bis(p-aminobenzoyl)ethylenediamine is from about 10 to 50 mol % on the basis of the amount of the diamine component.

7. The process according to claim 5, wherein the amount of N,N'-bis(p-aminobenzoyl)ethylenediamine is from about 12.5 to 30 mol % on the basis of the amount of the diamine component.

8. The process according to claim 5, wherein the reactive derivative of terephthalic acid is a terephthalyl dihalide.

9. The process according to claim 8, wherein the terephthalyl dihalide is terephthalyl dichloride or terephthalyl dibromide.

10. The process according to claim 5, wherein the amide polar solvent is hexamethylphosphoramide, N-methylyrrolidone, tetramethylurea or N,N-dimethylacetamide, or their mixture.

11. The process according to claim 5, wherein the amide polar solvent is a mixture of hexamethylphosphoramide and N-methylpyrrolidone.

12. The process according to claim 11, wherein the volume ratio of hexamethylphosphoramide and N-methylpyrrolidone is from about 3 : 1 to 1 : 4.

13. The process according to claim 5, wherein the amide polar solvent contains at least one of alkali metal salts and alkaline earth metal salts.

14. The process according to claim 5, wherein the dicarboxylic acid component is added to a solution of the diamine component in the amide polar solvent cooled at a temperature of from about $-30°$ to $10°$ C.

15. The process according to claim 5, wherein the polycondensation is effected in the presence of an acid-acceptor.

16. The process according to claim 15, wherein the acid-acceptor is used in an amount of not more than about 10% by volume on the basis of the volume of the amide polar solvent.

17. The process according to claim 15, wherein the acid-acceptor is triethylamine, pyridine, N-ethylmorpholine, N-ethylpiperidine or N-methylpyrrolidine, or their mixture.

* * * * *